June 9, 1925.  A. E. NORRIS  1,541,064
GRAB
Filed July 11, 1923   6 Sheets-Sheet 4

Inventor:
Almon E. Norris.

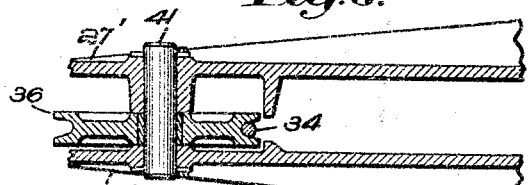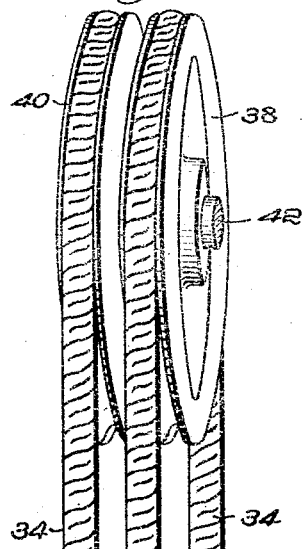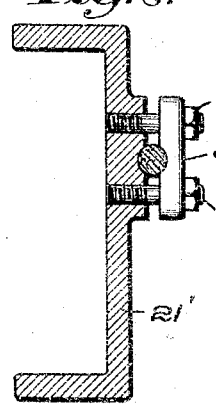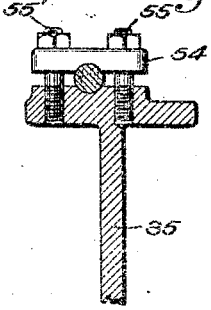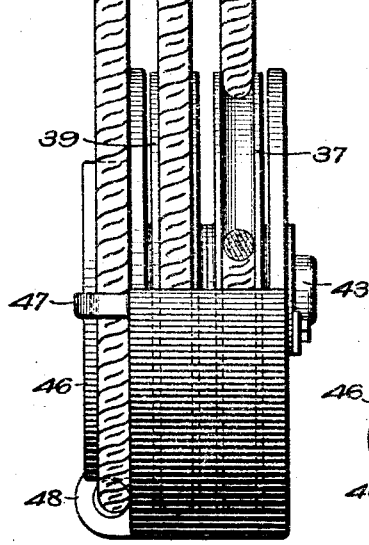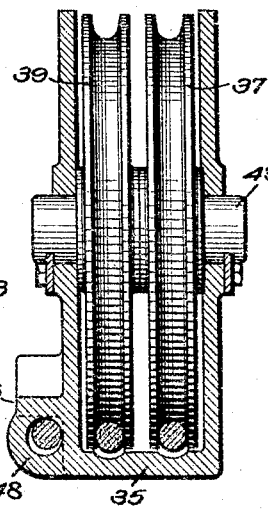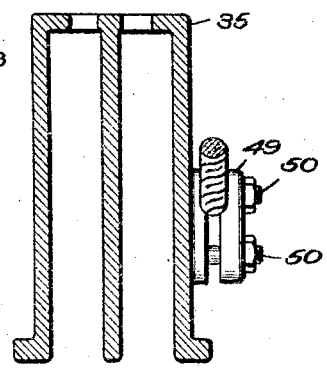

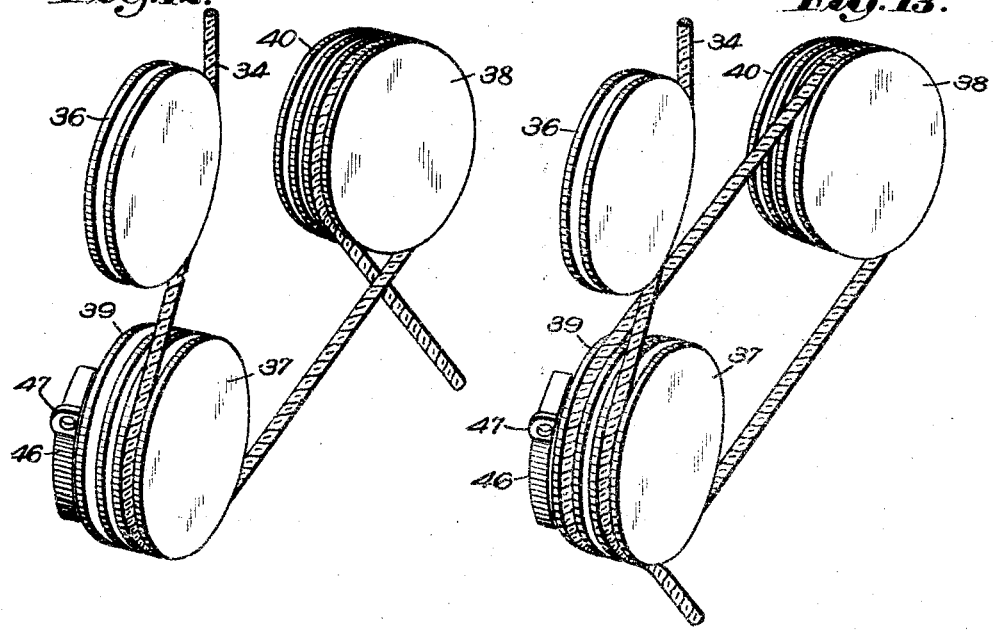
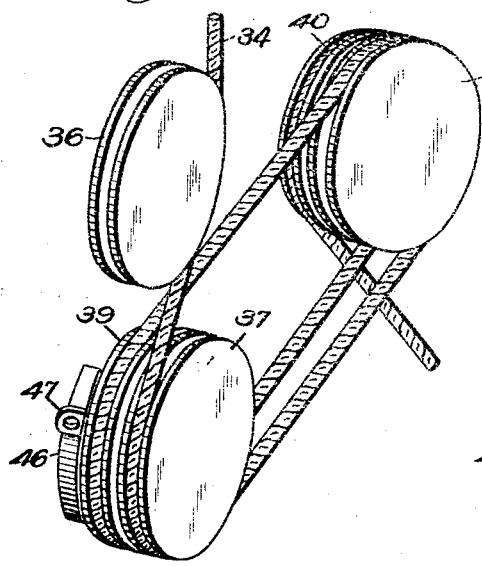
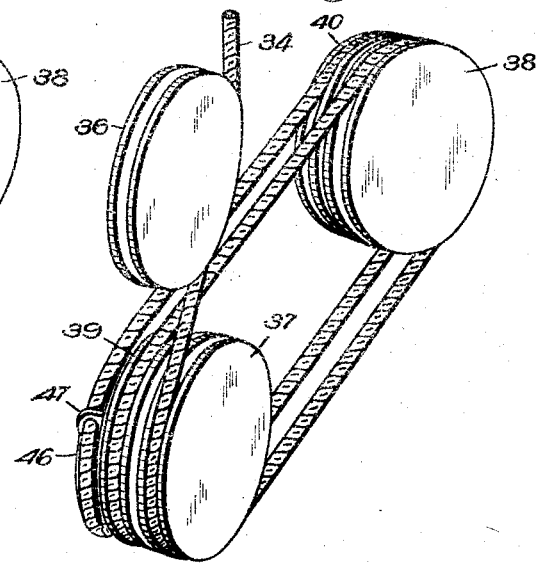

Patented June 9, 1925.

1,541,064

UNITED STATES PATENT OFFICE.

ALMON E. NORRIS, OF BROOKLINE, MASSACHUSETTS.

GRAB.

Application filed July 11, 1923. Serial No. 650,818.

*To all whom it may concern:*

Be it known that I, ALMON E. NORRIS, a citizen of the United States, and a resident of Brookline, in the county of Norfolk and State of Massachusetts, have invented an Improvement in Grabs, of which the following description, in connection with the accompanying drawings, is a specification, like characters on the drawings representing like parts.

This invention aims to provide a novel and improved two-rope grab having provision to enable the user to arrange the closing rope for several different purchases to adapt it to different classes of work.

The invention will be best understood by reference to the following description when taken in connection with the accompanying drawings of one specific embodiment thereof, while its scope will be more particularly pointed out in the appended claims.

In the drawings:

Fig. 6 is a sectional view on an enlarged scale on line 6—6 of Fig. 1;

Fig. 7 is a sectional view on an enlarged scale on line 7—7 of Fig. 1;

Fig. 8 is a sectional view on an enlarged scale on line 8—8 of Fig. 1;

Fig. 9 is a sectional view on an enlarged scale on line 9—9 of Fig. 1;

Fig. 10 is a sectional view on an enlarged scale on line 10—10 of Fig. 1;

Fig. 11 is a sectional view on an enlarged scale on line 11—11 of Fig. 1;

Figs. 12 to 15 inclusive are perspective views, somewhat diagrammatic in character, illustrating the arrangements of the closing rope for two, three, four and five-part purchases, respectively.

Figure 1:
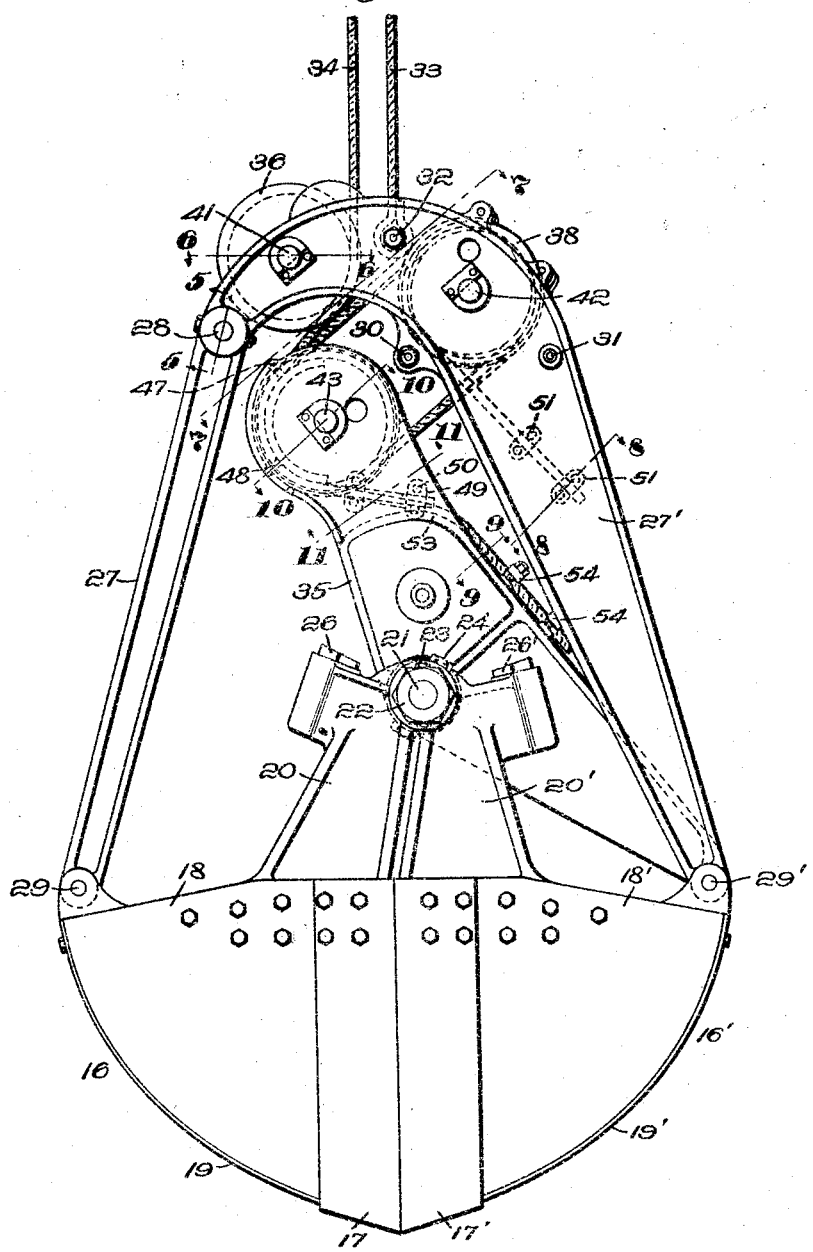
Fig. 1 is an end elevation of a grab exemplifying the invention.

Referring to the drawings and to the embodiment of the invention which is selected for exemplification and having particular reference at first to Fig. 1, there is shown a grab having a pair of scoops 16 and 16' provided with jaws 17 and 17' and end plates 18 and 18' united with each other by curved side plates 19 and 19'.

Figure 4:
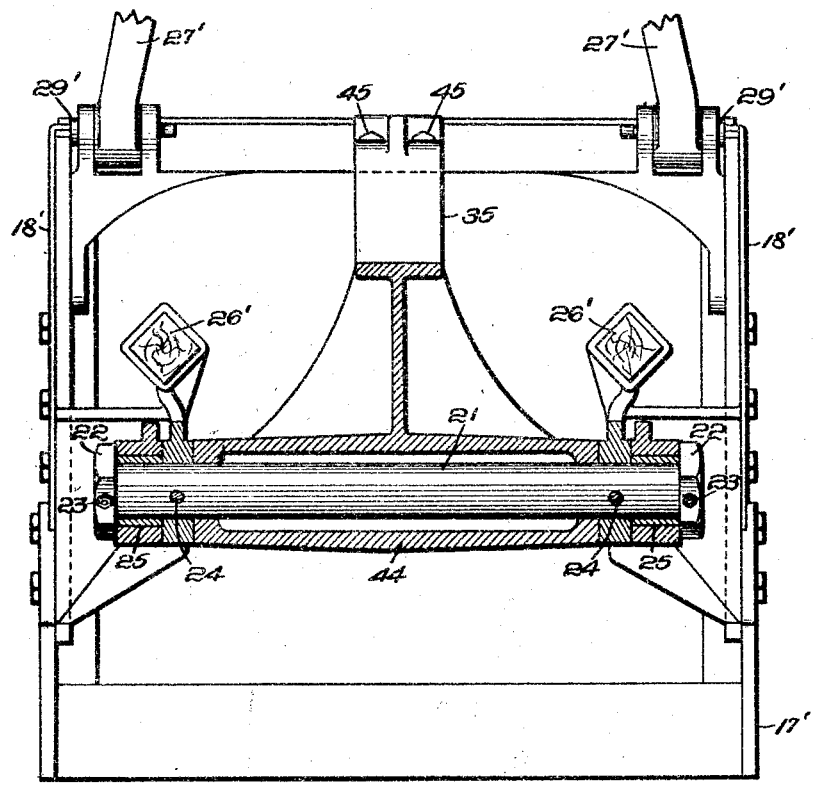
Fig. 4 is a sectional view on an enlarged scale on line 4—4 of Fig. 2.

The scoop 16 is provided with a pair of hinges 20 and the scoop 18' is provided with a similar pair of hinges 20', the hinges of one scoop being connected to those of the other scoop by a hinge pin 21, best shown in Fig. 4, appropriately held in place therein as by nuts 22 threaded onto the ends thereof and conveniently held against accidental turning movement by bolts 23 which extend through the nuts and through the hinge pin. The hinge pin is preferably held against turning movement in one pair of hinges as by bolts 24 which extend through the hinge pin as well as through the bosses of said hinges. On the other hand, the hinge pin turns in the bosses of the other pair of hinges, the latter being provided with renewable bushings 25 in which the hinge pin turns. Opening movement of the scoops is limited by appropriate stops 26 and 26'.

Figure 5:
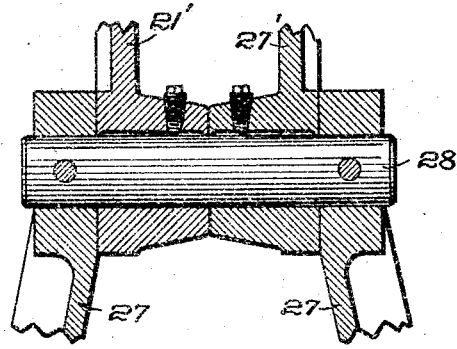
Fig. 5 is a sectional view on an enlarged scale on line 5—5 of Fig. 1.

The scoops are supported by appropriate supporting means herein comprising a pair of links 27 and a pair of links 27' pivotally connected to each other by a pivot 28 and to the scoops by pivots 29 and 29'. The members of each pair of links converge toward their upper ends where they are connected by the pivot 28 best shown in Fig. 5. The links 27' constitute a frame and they are preferably rigidly secured to each other as by tie-bolts 30 and 31. The links are further tied together by a bolt 32 to which is attached a holding rope 33.

Figure 2:
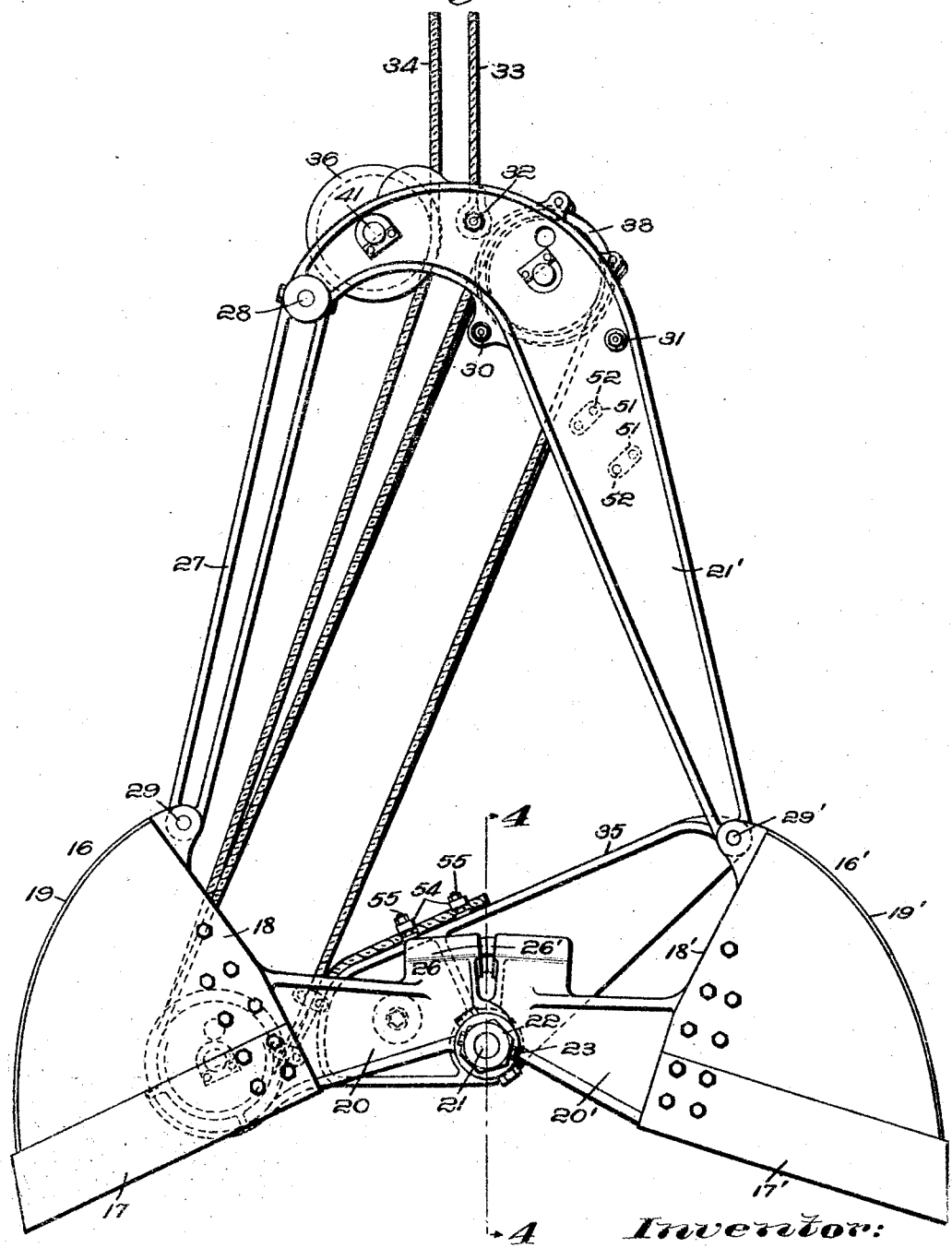
Fig. 2 is an end elevation of the grab as it appears when open.
Figure 3:
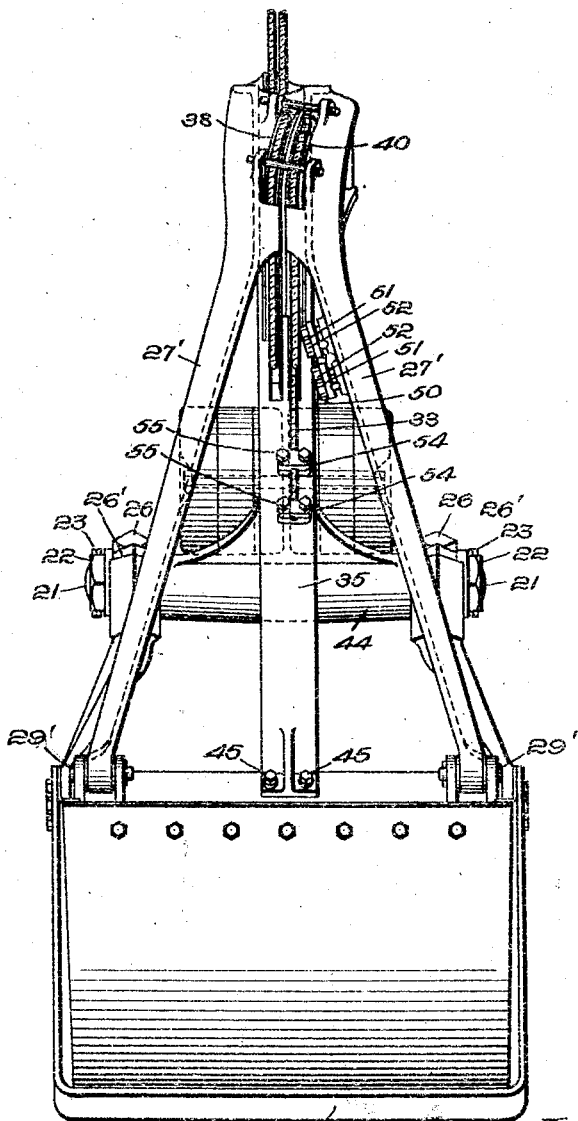
Fig. 3 is a side elevation of the grab as it appears when closed, the same being viewed from the right hand side of Fig. 1.

In the absence of any means to hold the grab closed, the scoops will naturally gravitate to the position represented in Fig. 2, their opening movement being limited by the stops 26 and 26'. The closing movement of the grab is accomplished by suitable closing means herein including a closing rope 34, a closing arm or lever 35 and a series of sheave wheels 36, 37, 38, 39 and 40 (see Fig. 12), some or all of which may be brought into play according to the arrangement of the closing rope for two, three, four and five part purchases as presently explained. In the present embodiment, the sheave wheel 36 is mounted on a fixed shaft 41 on the links 27', the sheave wheels 38 and 40 are mounted side by side on a common shaft 42 on said links and the sheave wheels 37 and 39 are mounted on a common shaft 43 on the closing arm or lever 35. The axis of the shaft 42 is inclined (see Fig. 7) to provide proper leads of the closing rope to and from the sheave wheels. The closing lever is provided with an elongated boss 44 (see Fig. 4) through which the hinge pin extends, while the lower end of the lever is secured to the scoop 16' by bolts 45 (see Fig. 3) which cause said lever and said scoop to move together as one piece during the opening and closing movements of the grab.

When the closing rope is arranged for a five-part purchase, it extends over the sheave wheels 36, 37, 38, 39 and 40 in the order named (see Fig. 15) and from the sheave wheel 40 it extends over a curved guide 46 which, as best shown in Fig. 10, is conveniently formed as a flange integral with the closing lever. To avoid any possibility of the closing rope slipping off the guide, the latter is herein provided with lugs 47 and 48 (see Fig. 7) through which the rope extends. The rope extends from the guide 46 to a nearby point on the closing member where it is dead-ended by means of clamps 49, one of which is shown in Fig. 11, having clamping bolts 50. When a four-part purchase is desired, the arrangement of the closing rope on the pulleys is the same as with a five-part purchase (see Fig. 14) except that the rope, after leaving the pulley 40, is secured to one of the links 27' by clamps 51, best shown in Fig. 8, provided with clamping bolts 52. When a three-part purchase is desired, the closing rope, after leaving the pulley 39, extends along a curved guide 53 (see Fig. 1) presented by the closing lever, and is secured to the latter by clamps 54, best shown in Fig. 9, provided with clamping bolts 55. When a two-purchase is desired, the closing rope, after leaving the pulley 38 (see Fig. 12), is secured by the same clamps 51 which are used for the four-part purchase.

Thus it is apparent that user is enabled to employ the one grab for a great variety of materials and under widely varying conditions by simply arranging the closing rope for any one of the described purchases, and can change from one to another with great facility and with little loss of time. The great advantage of this should be readily apparent. The term "rope", as employed in the specification and claims, is intended to include any mechanical equivalent thereof, such as a chain.

Having thus described one embodiment of my invention but without limiting myself thereto, what I claim and desire by Letters Patent to secure is:

1. A grab comprising, in combination, a pair of hinged jaws, supporting means therefor, a holding rope attached to said supporting means, a closing arm carried by one of said jaws, a closing rope, and means providing for arrangement of said closing rope for two, three, four and five part purchases.

2. A grab comprising, in combination, a pair of hinged jaws, supporting means therefor, a holding rope attached to said supporting means, a closing arm carried by one of said jaws, a closing rope, and means providing for arrangement of said closing rope for two and five part purchases.

3. A grab comprising, in combination, a pair of hinged jaws, supporting means therefor, a holding rope attached to said supporting means, a closing arm carried by one of said jaws, two sheave wheels carried by said closing arm, three sheave wheels carried by said supporting means, and a closing rope adapted to cooperate with some or all of said sheave wheels.

4. A grab comprising, in combination, a pair of hinged jaws, supporting means therefor including two links pivoted to each other and to said jaws, respectively, a holding rope attached to one of said links, a closing arm carried by one of said jaws, two sheave wheels carried by said closing arm, three sheave wheels carried by said link to which said supporting rope is attached, and a closing rope adapted to cooperate with some or all of said sheave wheels.

5. A grab comprising, in combination, a pair of hinged jaws, supporting means therefor including two links pivoted to each other and to said jaws, respectively, a holding rope attached to one of said links, a closing arm carried by one of said jaws, two sheave wheels and a guide carried by said closing arm, three sheave wheels carried by said link to which said supporting rope is attached, and a closing rope adapted to cooperate with said sheave wheels and said guide.

6. A grab comprising, in combination, a pair of hinged jaws, supporting means therefor including a link pivoted to one of said jaws, a holding rope attached to said link, a closing lever attached to and moving in unison with such jaw, and means providing for arrangement of said closing rope for different purchases, said means including three sheave wheels journaled on said link, two sheave wheels journaled on said lever, and clamps on said link and on said lever.

7. A grab comprising, in combination, a pair of hinged jaws, supporting means therefor including a link pivoted to one of said jaws, a holding rope attached to said link, a closing lever attached to and moving in unison with such jaw, and means providing for arrangement of said closing rope for different purchases, said means including three sheave wheels journaled on said link, two sheave wheels journaled on said lever, a rope guide on said lever, and clamps on said link and on said lever.

In testimony whereof, I have signed my name to this specification.

ALMON E. NORRIS.